United States Patent Office.

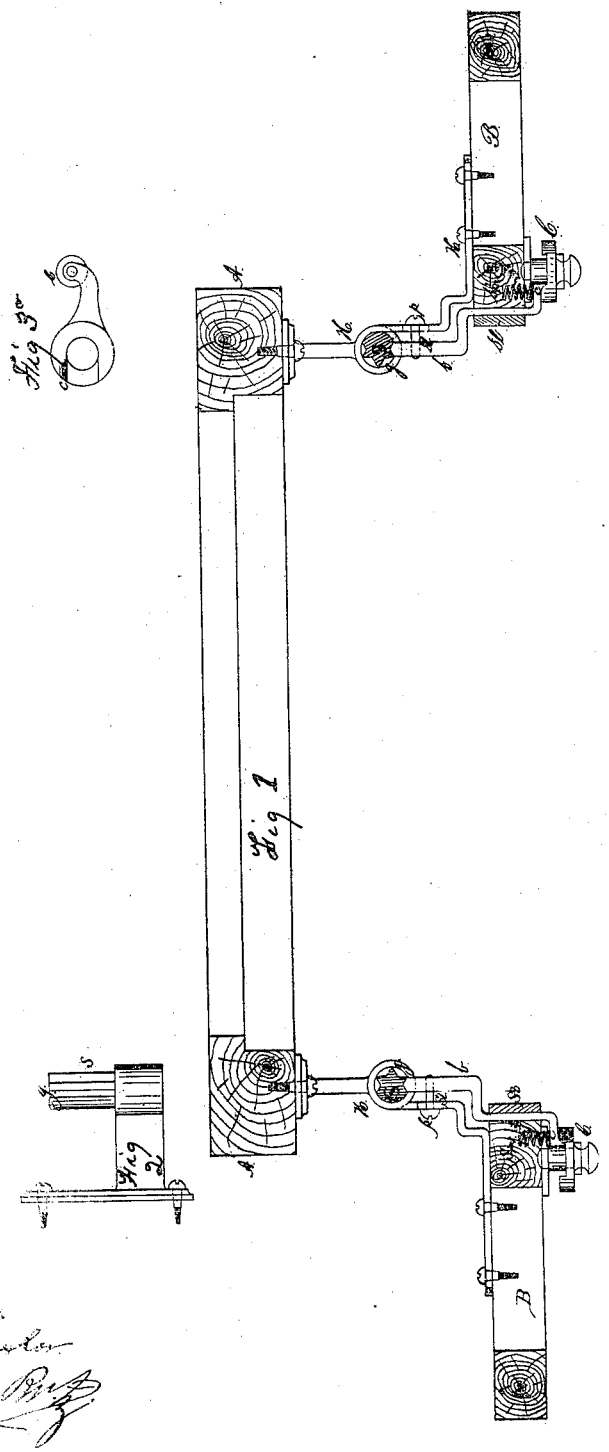

JOHN H. NEVINS, OF BROOKLYN, E. D., NEW YORK, ASSIGNOR TO WILLIAM A. BOSMAN, OF SAME PLACE.

Letters Patent No. 106,272, dated August 9, 1870.

IMPROVEMENT IN BLIND-FASTENING HINGES.

The Schedule referred to in these Letters Patent and making part of the same.

I, JOHN H. NEVINS, of Brooklyn, E. D., in the county of Kings and State of New York, have invented certain Improvements in Lock-Hinges for Blinds and other uses.

Nature and Object of my Invention.

The object is to secure means whereby blinds, doors, &c., may be held stationary, both at, and at given points between, the extremes of their positions in practical use.

When shut, and when wide open, various means are now used for holding them in such positions more or less firmly.

The intention or object of my invention is to provide one system of fastening suited to both these positions, and to any given positions between them, to be operated from the inner side of the blind or door.

The means made use of to effect this result are a corrugated or grooved stud with a spring bolt of shape corresponding to the grooves, shooting into the same, or removed therefrom by the motion of an arm or finger-piece, provided with a cam.

This corrugation or groove, in the stud or pintle, and the corresponding or thereto-fitting end of the bolt has a peculiar shape and character.

A number of slots would cut the stud or pintle almost entirely away; the use, however, of perpendicular grooves or corrugations, does not materially affect the strength of the stud.

The sides of the grooves in this case are so cut as to lie nearly at an angle of forty-five degrees with the bolt $b$, and its line of movement, when the bolt is in that particular groove.

The end of the bolt has a shape necessary to fit these grooves closely.

The pressure of the blind, actuated by the wind, or by a hand, will be, as near as may be, in line with the bolt.

This is the line of greatest strength, and a line at right angles thereto would be that of the least strength of the bolt.

Through this line of the greatest strength, alternately or at will, the force used is communicated to the cam and groove.

Description of the Accompanying Drawing.

Figure 1 is a transverse sectional view, showing the position of the parts when the blinds are open.

Figure 2 is an elevation showing the corrugated or grooved stud.

Figure 3 is an under or back-side elevation of the finger-piece with its cam.

General Description.

A A represents the window-frame.
B B, the blinds.
C C, the cam-piece, in each figure.
H H, the hinge.
Sl. Sl., slides in which the bolts $b\ b$ move.
S S, the stud or spindle, in each figure.
$b\ b$, the bolts.
$g\ g$, the grooves.
$p\ p$, the pins, fixed in the hinges H H and sliding in the slots Sl. Sl.
Sp. Sp. the springs, actuating the bolts $b\ b$, when the pressure of the cams C C is relieved or released.

So long as the pressure of the cam C is continued, the pointed end of the bolt $b$ is held firmly into the groove $g$, thus locking the blind and preventing motion in either direction.

Whenever the pressure of the cam is released, the spring Sp. operates and withdraws the bolt from the groove $g$, unlocking the blind and permitting free motion thereof.

The number of positions and the varying angles of these positions of the blinds will depend upon the numbers, size, and positions of the grooves in the stud S, which may be varied to suit; and whatever these may be in any given case, the blind may be held in place, not subject to the control of the wind, and in some cases presenting obstacles to burglarous intentions.

In the drawing, that part of the hinge which is attached to the blind is crooked, as also the bolt $b$, to permit the blind, when shut, to come duly into place. This may be made in the ordinary form and the bolt straight, by making a corresponding change in the part of the hinge screwed to the window-frame, thus bringing the stud over to the line of the jamb, but the method illustrated is preferred.

Claims.

I claim as my invention—

1. The pintle of a hinge provided with grooves or corrugations having inclined sides fitting the end of the locking-bolt, whereby the force used is distributed in line with the bolt.

2. The combination of the cam C, spring bolt $b$, and corrugated stud S, for the purpose named.

JOHN H. NEVINS.

Witnesses:
JAMES T. TAYLOR,
ADAM P. RUG.